United States Patent [19]
Bonzi

[11] 3,804,398
[45] Apr. 16, 1974

[54] PALLET CLAMP
[75] Inventor: Stephen A. Bonzi, Rockford, Ill.
[73] Assignee: The Babcock & Wilcox Company, New York, N.Y.
[22] Filed: Apr. 17, 1972
[21] Appl. No.: 244,568

[52] U.S. Cl............. 269/218, 90/88, 269/153, 269/224, 269/227, 269/232
[51] Int. Cl.............................................. B25b 1/08
[58] Field of Search....... 269/218, 34, 42, 107, 119, 269/142, 153, 224, 227, 229, 232; 90/88, 90/DIG. 16

[56] References Cited
UNITED STATES PATENTS
659,761   10/1900   Pashley.................... 269/227 X
2,818,002  12/1957   Barker et al................ 269/227 X
2,251,016   7/1941   Gallimore................... 269/232 X
2,025,706  12/1935   Birkebak.................... 269/218 X
2,338,603   1/1944   Schultz...................... 269/34
2,514,099   7/1950   Soderman................... 29/200 P
3,010,728  11/1961   Jennings.................... 279/110 X FOREIGN PATENTS OR APPLICATIONS
299,687    /1928   Great Britain................ 269/224

Primary Examiner—Al Lawrence Smith
Assistant Examiner—J. T. Zatarga

[57] ABSTRACT

A device for use in the simultaneous and precise activation of a clamp having a jaw and a pin, both of which will simultaneously secure, position and align a pallet relative to a working station of a transfer line.

2 Claims, 3 Drawing Figures

PATENTED APR 16 1974 3,804,398

PALLET CLAMP

This invention relates to a device for use in the optimization of effective and efficient orientation and clamping of a pallet relative to a station along a transfer line consisting of a number of such working stations.

More particularly, this invention relates to a device for use in the positive and effective longitudinal, vertical, and diagonal alignment and fixing or clamping of a pallet relative to a station for use in performing a predetermined machine operation on the specified workpiece secured to such pallet.

In the art, there are many individual clamps of various patterns of design which are proposed for use in an attempt to provide the proper orientation of a pallet relative to an automated tool. The aforesaid pallet has a blank workpiece secured thereto and the tool performs its specified function on the workpiece while it is in a properly secured attitude at a stationary position. At the conclusion of the performance of the automated tool, the clamps become automatically released and the workpiece-supporting pallet moves to a new station along a longitudinal path by ordinary conventional means.

The difficulty of many of the clamps used in securing individual pallets are their relatively complicated and cumbersome design. Also, in many instances, some of the individual elements of the same clamp may become inoperative.

What is needed in the art is an uncomplicated and simplified clamp for ease of operation, replacement and repair of such item before, during and after its associated function relative to securing a pallet in proper attitude at a work station.

The subject invention accomplishes the needs of the art and overcomes the aforesaid difficulties with special emphasis on a clamping device for use on a pallet, such device providing the simultaneous activation of a locating device for positioning and the application of a force for securing a pallet at a work station.

It is an object of this invention to provide a novel device for use in securing a pallet in a longitudinal, vertical and diagonal attitude relative to a station of a longitudinal path consisting of fixed tooling devices.

Another object is to provide a simple and uncomplicated device for use in fixing a pallet which carries a work-piece in proper attitude for the receipt of a succession of tooling operations.

There are many and further objects which will become apparent to one skilled in the art upon a reading of the following detailed specification when taken in view of the drawings wherein.

Similar numerals relate to similar parts throughout the several views.

Figure 1:
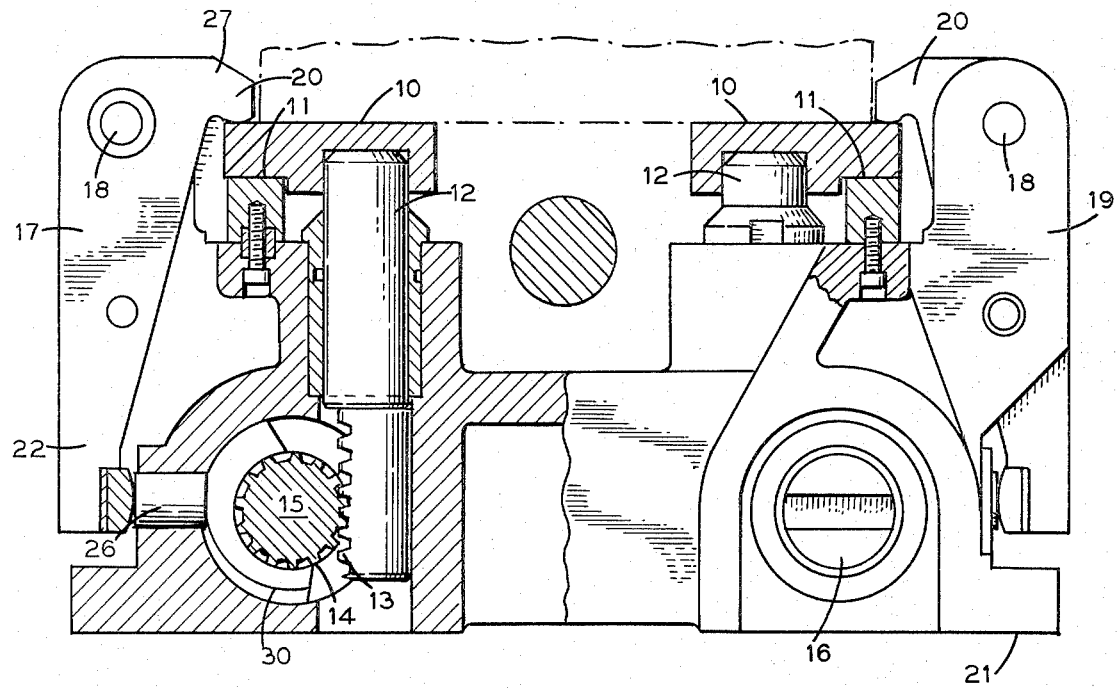
FIG. 1 is an end view of the work station with section cut away.

As shown in FIG. 1, the pallet 10 rests on rails 11 at a specific station in the work-transfer line. The actuation of the pin 12 is by simple rack 13 and pinion 14 engagement as shown. The latter pinion is cut directly into the actuating shaft 15 so that the pin 12 moves up and down in exact relation to the rotation of shaft 15. The two pins 12 are located on opposite sides of the work station and are diagonally opposed.

Actuation of a jaw 20 on clamp 17 is also caused by rotation of the shaft 15 but in a rather complex manner. Initially, it should be noted that the axial motion of a transverse pin 26 in a direction away from the shaft will apply force to the long downwardly projecting leg 22 of clamp 17. In this manner a larger downward clamping force is applied by the shorter leg 27 of clamp 17 on the upper surface of the pallet 10. Clamp 17 pivots on pin 18 which extends into ears 19 attached to base 21. Four clamps secure the pallet at each work station.

As is evident, the transverse pin 26 is forced outwardly by a cam surface 30 which is cylindrical but eccentric to the rotatable shaft 15. The cam surface 30 is not part of the shaft, as shown in FIG. 3, but is part of a bushing 32 which is loosely fitted over shaft 15.

As will be more fully described below, there is rotational "lost motion" between shaft 15 and the bushing 32. Thus, the counterclockwise rotation of shaft 15 first raises pin 12 to engage and locate the pallet 10. During this initial rotation, bushing 32 also rotates causing jaw 20 to close up the clearance at the upper surface of the pallet. After the pin 12 has sufficiently entered the pallet to assure its accurate positioning, continued rotation of shaft 15 further rotates bushing 32 so that cam surface 30 acts through transverse pin 26 and jaw 20 to exert a clamping downward force on the upper surface of the pallet 10. Similar effects are produced by clockwise rotation of shaft 16.

During the motion described above, pin 12 continues upward into the pallet, but this motion is relatively slight. As will appear below, the driving connection between shaft 15 and bushing 32 includes a spring which is compressed by the rotation of shaft 15 after contact has been made with the upper surface of pallet 10. This spring compression furnishes the torque to assure a large clamping force at the point of contact of the jaw and the upper surface of the pallet. The latter force is furnished by way of jaw 20, transverse pin 26 and eccentric cam 30. To release the pallet, shaft 15 is turned clockwise and shaft 16 counterclockwise as more fully described below.

Figure 3:
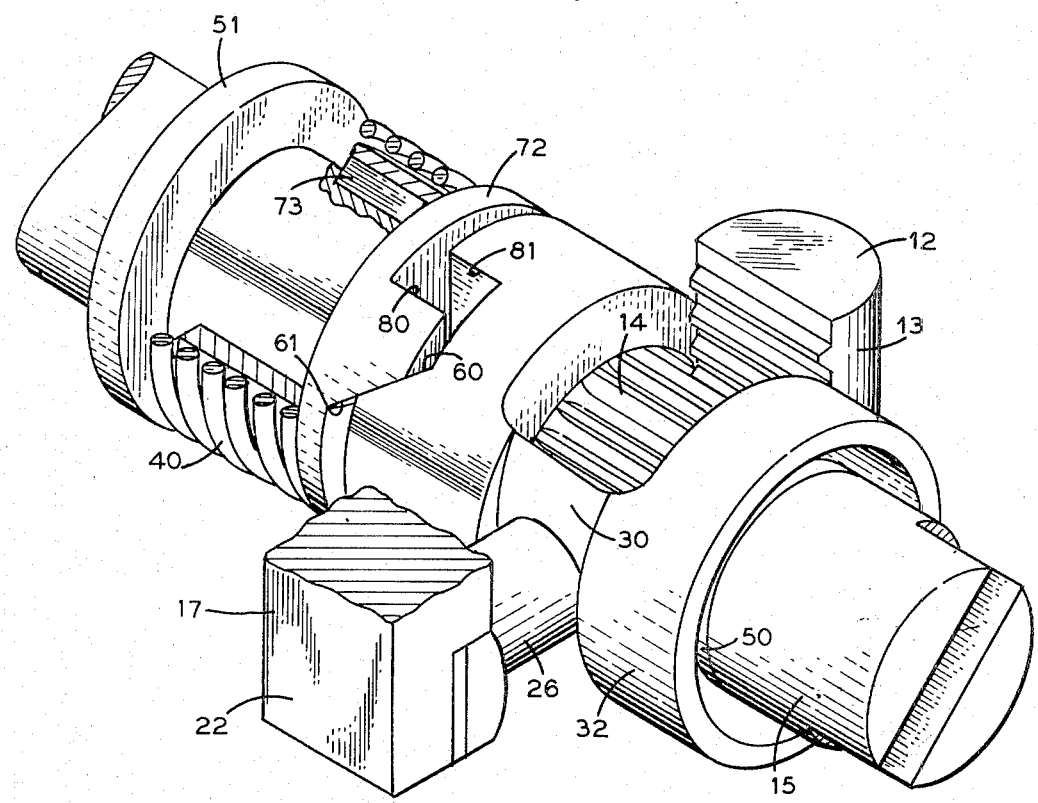
FIG. 3 is an isometric view of one shaft assembly.

Referring now to FIG. 3, the shaft 15, pin 26, eccentric cam 30, bushing 32 and a lower portion 22 of clamp 17 are shown. As shown, pinion 14 is cut integrally into a portion of the shaft 15 and engages rack 13. Accordingly, whenever shaft 15 rotates, rack 13 will be responsive.

Figure 2:
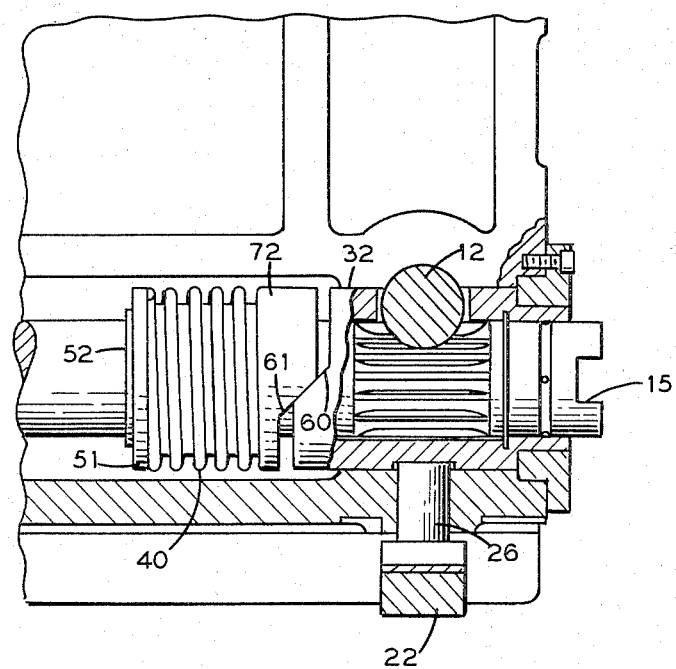
FIG. 2 is a partial sectional plan view.

As aforesaid, bushing 32 is rotationally loose on shaft 15 but is retained axially by a snap type ring 50 fitted into a groove in shaft 14. As shown, shaft 15, has been rotated counterclockwise and the spring 40 has been somewhat compressed. A second bushing 72 is free to move axially on shaft 15 but key 73 causes bushing 72 to rotate with shaft 15. Spring 40 surrounds a reduced diameter portion of bushing 72 and is retained between the flange of bushing 72 and ring 51 which is retained by a snap ring 52, FIG. 2. The following sequences of mechanical events describe the operations when a pallet is received at a work station: Shaft 15 is rotated counterclockwise which seats pin 12 into the pallet thereby positioning the pallet in proper relationship, longitudinally, vertically and diagonally, to the work operation; clearance between jaw 20 and the upper face of the pallet is closed up during which time bushings 32 and 72 rotate with shaft 15 and abut on surfaces 80 and 81; resistance to further rotation of bushing 32 with shaft 15 is created by the reaction of clamp 17 on cam surface 30 through pin 26; bushings 72 and 32 start to separate and sliding action along complementary cam surfaces 60 and 61 compresses spring 40 thereby increasing the torque on bushing 32 to effect positive clamping action on the pallet. When clamping is completed, the effective wedge angle between surface 30 and pin 26 has been found to be such that the clamp is self-locking. The friction between surface 30 and pin 26 will not permit the clamp to release even if the compressive force of spring 40 is relaxed.

The initial residual compression of spring 40 provides sufficient force to rotate bushing 32 with shaft 15 during the initial period of rotation until jaw 20 contacts the pallet. There is then a period of non-rotation of bushing 32 while shaft 15 further rotates permitting positive alignment of the pallet before final clamping force is applied by further compression of spring 40.

It will be understood that each of the four clamps are provided with actuating mechanisms essentially identical to that described for clamp 17 except that there are no locating pins and associated mechanisms in two diagonally opposed clamps. Since the clamping force for each lever is finally established by its own individual spring, the clamps are independently spring-set and each will adjust to its own minor variations in dimensions and the angular travel of shafts 15 and 16 need not be finely adjusted to variations among the clamps.

To release the pallet, shaft 15 is rotated clockwise which extends spring 40 and retracts pin 12. Upon continued rotation, surfaces 80 and 81 will abut and further rotation will impart motion to bushing 32 which breaks the self-locking engagement between surface 30 and pin 26. Leg 22 is maintained in contact with pin 26 by spring tension not shown.

I claim: an with

1. A device for selectively engaging a pallet comprising, a pin, a rotatable shaft for producing a linear motion in said pin in response to said shaft rotation to contact one portion of the pallet, cam means for selective rotation with said shaft, a jaw controlled by said selectively rotatable cam means to engage another portion of the pallet, and transverse complementary cam means for engaging said selectively rotatable cam means to rotate with said shaft in order to enable said selectively rotatable cam means to engage and disengage said jaw in cooperation with said means for producing linear motion.

2. A device for selectively engaging a pallet comprising a rotatable shaft, a pinion for rotation with said shaft, a rack for linear movement in response to said pinion rotation to contact one portion of the pallet, a bushing for selective rotation on said shaft, an axially disposed cam on said bushing, a follower movable in response to said axial cam, a jaw controlled by the movement of said follower to engage another portion of the pallet, a transverse cam on said bushing, a flange rotatable with said shaft, and axially slidable flange rotatable by said shaft and having a transverse cam formed thereon for selective engagement wit said transverse bushing cam to engage and disengage said bushing for rotation with said shaft, and spring means interposed between said flanges to drive said transverse cams into mutual engagement and release said cams from said engagement in response to the rotation of said shaft in order to enable said axially disposed cam and follower to selectively engage and disengage said jaw with the pallet.

* * * * *